US012703232B2

(12) United States Patent
Eakmbe et al.

(10) Patent No.: US 12,703,232 B2
(45) Date of Patent: Aug. 11, 2026

(54) SEALING ASSEMBLY FOR A TRUCK COMPRISING A MOVABLE CABIN

(71) Applicant: Volvo Truck Corporation, Gothenburg (SE)

(72) Inventors: Gangaram Baliram Eakmbe, Bangalore (IN); Akansha Vohra, Uttarakhand (IN)

(73) Assignee: Volvo Truck Corporation, Gothenburg (SE)

( * ) Notice: Subject to any disclaimer, the term of this patent is extended or adjusted under 35 U.S.C. 154(b) by 421 days.

(21) Appl. No.: 18/413,245

(22) Filed: Jan. 16, 2024

(65) Prior Publication Data

US 2024/0253437 A1 Aug. 1, 2024

(30) Foreign Application Priority Data

Jan. 30, 2023 (EP) .................................... 23153975

(51) Int. Cl.
*B60J 10/15* (2016.01)
*B60J 10/21* (2016.01)
*B60J 10/32* (2016.01)

(52) U.S. Cl.
CPC ............... *B60J 10/15* (2016.02); *B60J 10/21* (2016.02); *B60J 10/32* (2016.02)

(58) Field of Classification Search
CPC ... B60J 10/15; B60J 10/21; B60J 10/32; B60J 7/1657; B62D 33/06; B62D 33/067; B62D 33/063; B62D 25/10; E02F 9/166; B66C 13/54; B60R 13/0838; B60R 13/08
USPC .................................... 296/190.04, 190–199
See application file for complete search history.

(56) References Cited

U.S. PATENT DOCUMENTS

| | | | | |
|---|---|---|---|---|
| 4,082,343 A * | 4/1978 | Hurt, II | ................. | B60R 21/131<br>296/35.1 |
| 10,214,159 B1 * | 2/2019 | An | ...................... | B60R 13/0838 |
| 2024/0190520 A1 * | 6/2024 | Eakmbe | ............... | B62D 35/001 |

FOREIGN PATENT DOCUMENTS

| | | |
|---|---|---|
| DE | 4341693 A1 | 7/1994 |
| JP | S5382021 U | 7/1978 |
| JP | 2010116028 A * | 5/2010 |

OTHER PUBLICATIONS

Extended European Search Report for European Patent Application No. 23153975.0, mailed Jul. 6, 2023, 7 pages.

* cited by examiner

*Primary Examiner* — Amy R Weisberg
*Assistant Examiner* — Philip C Adams
(74) *Attorney, Agent, or Firm* — Withrow & Terranova, PLLC

(57) ABSTRACT

A sealing assembly for a truck comprising a cabin movable relatively to a truck frame, the sealing assembly being configured for sealing a gap between the cabin and a bodywork element fixed relatively to the truck frame, the sealing assembly comprising a support member attached to the cabin, comprising a first abutment member, a second abutment member, a bracket comprising a first flange movable between the first abutment member and the second abutment member, a second flange, a sealing member linking the first flange and the second flange, an elastic member disposed between the first flange and the first abutment member and configured for biasing the first flange against the second abutment member, in which the second flange is configured for contacting the frame-fixed bodywork element, so that a sealed junction is formed.

16 Claims, 5 Drawing Sheets

(A)
(B)
(C)
50
4
9
5
8
7
6
6A
6B
86
87
85
1
2
3
16
75
(P)
(L)
(U)
F1
F2
X
Y
Z

SEALING ASSEMBLY FOR A TRUCK COMPRISING A MOVABLE CABIN

PRIORITY APPLICATIONS

This present application claims priority to European patent application Ser. No. 23/153,975.0, filed on Jan. 30, 2023, and entitled "SEALING ASSEMBLY FOR A TRUCK COMPRISING A MOVABLE CABIN," which is incorporated herein by reference in its entirety.

TECHNICAL FIELD

This disclosure relates to a sealing assembly for equipping an industrial vehicle, in particular a cab-over truck.

BACKGROUND ART

The cabin of a truck is usually suspended relatively to the frame of the truck. In a cab-over truck, the cabin can also be tilted relatively to the frame assembly, to provide access to the engine, for example for maintenance work. A clearance, or gap, is thus provided between the cabin and the bodywork elements that are fixed relatively to the frame. This gap is necessary to avoid interference between the bodywork elements that are tilted together with the cabin and the bodywork elements that remain in place when the cabin is tilted. Also, this gap is required to accommodate the relative movement between the frame or chassis of the truck and the cabin, when the truck is in motion. A gap generally exists from the left-hand side to the right-hand side corner of the truck between the cabin and the headlight assembly. A gap also exists between the cabin and the front grille.

The bottom of the front lid of the cabin usually overlaps the top of the headlight assembly and the grille along a vertical direction. A gap is left in the longitudinal direction to allow the cabin to be tilted without interference with the headlight assembly and also to accommodate relative movements between the frame and the cabin.

This gap usually induces some aerodynamic drag, because some air can flow through the opened gap, which disturbs the air flow on the bodywork of the cabin. This aerodynamic disturbance results in fuel consumption penalty, especially at highway cruising speeds.

To try to reduce this disturbance, the upper part of the headlight assembly may be made of a flexible material forming a wall-like section. In this case, the existing gap can be reduced since the flexible material can accommodate a certain degree of mechanical interference. Although such a configuration may bring some benefits for reducing the airflow disturbance, long term reliability may be an issue as the mechanical constraints on the flexible material may be quite high. Furthermore, the remaining gap varies with the vertical position of the cabin, which is suspended over the frame and thus can move up and down while vehicle is in motion. This means that the gap may be significantly wider during large amplitude oscillations of the cabin, giving aero/fuel penalty.

There is therefore a need for a solution providing a better sealing of the gap between a suspended and tiltable cabin and the bodywork elements fixed relatively to the frame of the truck.

SUMMARY

To this end, it is proposed a sealing assembly for a truck comprising a cabin movable relatively to a truck frame, the sealing assembly being configured for sealing a gap between the cabin and a bodywork element fixed relatively to the truck frame, the sealing assembly comprising:

- a support member attached to the cabin, the support member comprising:
  - a first abutment member,
  - a second abutment member,
- a bracket comprising:
  - a first flange movable between the first abutment member and the second abutment member,
  - a second flange,
  - a sealing member linking the first flange and the second flange,
- an elastic member disposed between the first flange of the bracket and the first abutment member of the support member and configured for biasing the first flange in direction of the second abutment member, in which the second flange is configured for contacting the frame-fixed bodywork element, so that a sealed junction between the support member and the bodywork element is formed.

The arrangement of the support member, the bracket and the elastic member provides a sealed junction between the support member and the bodywork element. The gap between the cabin and the bodywork element fixed relatively to the truck frame is thus closed, even when the position of the cabin changes relatively to the frame. Air flow resulting from truck speed cannot enter through the sealed gap anymore, therefore the aerodynamic losses are reduced. Fuel economy is improved.

The following features can optionally be implemented, separately or in combination one with the others:

The sealing assembly is an airflow sealing assembly.

The support member is rigid.

The bracket is rigid.

In some examples, the support member is made of plastic material.

In some examples, the bracket is made of plastic material.

In this case, the first flange, the sealing member and the second flange are integral together.

According to an aspect of the invention, a sealed junction between the support member and the bodywork element is formed when the bracket is in contact with the bodywork element.

The cabin is suspended relatively to the frame of the truck.

The cabin is tiltable relatively to the frame of the truck.

The cabin is movable between an extreme upper position and an extreme lower position.

The cabin is movable around a reference position comprised between the extreme upper position and the extreme lower position.

In some examples of the sealing assembly, the first abutment member of the support member and the second abutment member of the support member extend in parallel planes.

The support member comprises a linking portion linking the first abutment member and the second abutment member.

According to some examples of the sealing assembly, a cross section of the support member has a U shape.

The support member can thus be compact.

The sealing member of the bracket is continuous.

The sealing member is an airflow deviating surface that seals the gap between the cabin and the bodywork element fixed relatively to the truck frame.

In some examples of the sealing assembly, the second flange of the bracket comprises:

- a first section configured for contacting a top surface of the frame-fixed bodywork element,
- a second section configured for contacting a side surface of the frame-fixed bodywork.

The two contact sections, each making contact with a different portion of the bodywork element, provide an efficient sealing tolerant to relative movements between the bracket and the bodywork element.

The second flange has a L-shaped cross-section.

In some examples, the first section of the second flange and the first flange may extend in parallel planes.

In some examples of the sealing assembly, the first flange is slanted relatively to the second flange.

This orientation is well suited to cope with both translation movements and rotation movements of the cabin with respect to the frame of the truck.

The first flange makes an angle comprised between 10° and 25° relatively to the first section of the second flange.

In some examples of the sealing assembly, the sealing member is slanted relatively to the first section of the second flange and is slanted relatively to the second section of the second flange.

This orientation is well suited to cope with both translation movements and rotation movements of the cabin with respect to the frame of the truck.

According to an example of implementation, the second flange and a contact area of the frame-fixed bodywork element have complementary shapes.

In some examples of the sealing assembly, the elastic member comprises a first contact surface contacting the first abutment member and a second contact surface contacting the first flange of the bracket.

The first contact surface of the elastic member may be fixed to the first abutment member of the support member.

According to some examples of the sealing assembly, the elastic member comprises bellows type springs or any other compressible element.

In some examples, the elastic member is a bellows type spring or any other compressible element. This compressible element can be continuous or divided in individual segments, based on the desired compressible function.

This kind of spring can be installed in a stable way.

The elastic member comprises two wavy sections extending side by side. The two wavy sections are integral with a top linking part and a bottom linking part. The elastic member defines a closed volume with the wavy sections forming lateral boundaries of the closed volume.

The elastic member is for example made of rubber material.

The support member, the elastic member and the first flange of the bracket define a closed volume when the first flange is in contact with the second abutment member.

Even when the first flange is lifted from the second abutment member, the air flow can't go through the defined volume, since the only opening is the gap opened between the first flange and the second abutment member.

In some examples of the sealing assembly, the elastic member comprises a set of metal springs.

The metal springs of the set of metal springs are helical springs.

The metal springs of the set of metal springs extend in parallel directions and are spaced apart from one another.

According to an aspect of the sealing assembly, the support member is configured to be attached to a bodywork element of the cabin.

The sealing assembly can thus be installed as an aftermarket equipment, since it can be attached to an existing piece of bodywork.

In some examples, the support member is configured to be attached to a front lid of the truck.

In another example, the support member is integral with a front lid of the cabin.

Installation is made easier and quicker.

In an implementation of the sealing assembly, the frame-fixed bodywork element is a headlight panel of the truck.

Alternatively or in a complementary way, the frame-fixed bodywork element is a front grille of the truck.

The sealing assembly comprises a first portion configured for extending transversally relatively to the truck frame and a second portion configured for extending longitudinally relatively to the truck frame, the first and second portion being linked by a third portion.

The third portion may be curved.

The disclosure also relates to an aftermarket kit comprising:

- a sealing assembly as described earlier,
- a fixing member configured for fixing the support member to a front lid of the truck.

The disclosure relates as well to a truck comprising a sealing assembly as described earlier, or comprising an aftermarket kit as above, in which the truck comprises a frame and cabin movable relatively to the frame, and in which the sealing assembly is disposed on a front corner of the truck.

In some examples, the truck comprises a second sealing assembly disposed on a second front corner of the truck.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Certain elements or parameters can be indexed, that is to say designated for example by ‘first element’ or second element, or first parameter and second parameter, etc. The purpose of this indexing is to differentiate elements or parameters that are similar, but not identical. This indexing does not imply a priority of one element, or one parameter over another, and their names can be interchanged. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Figure 1:
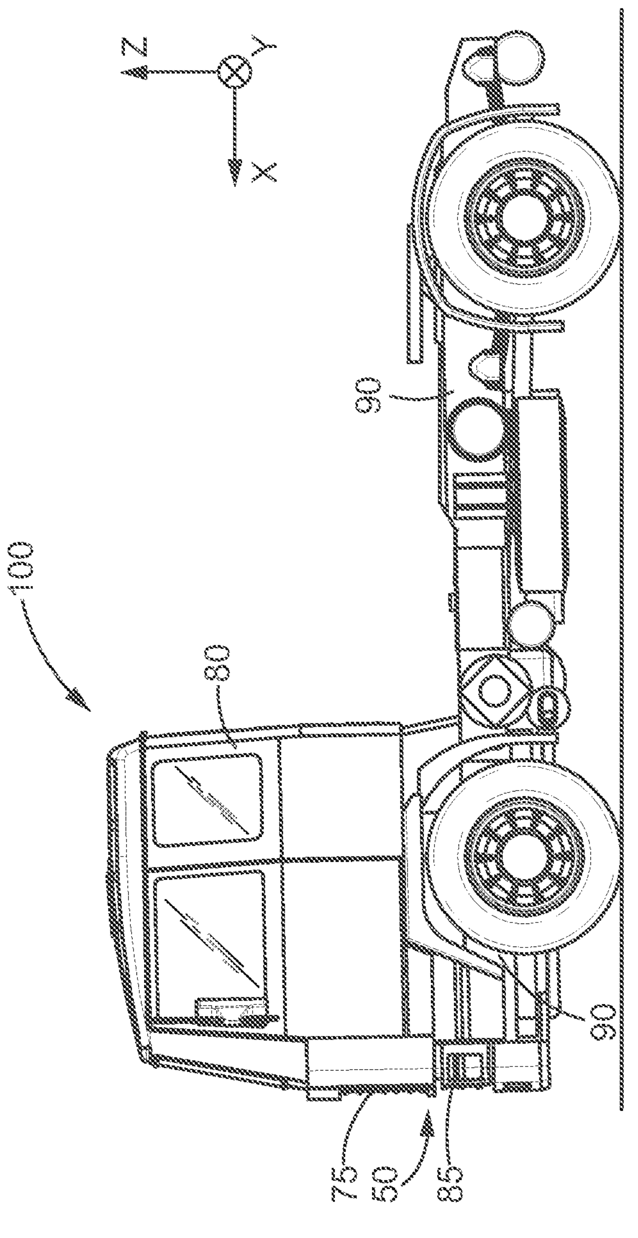
FIG. 1 is a schematic side view of a truck equipped with a sealing assembly according to the disclosure.

FIG. 1 illustrates a truck 100. The truck 100 is a cab-over truck, which means the nose of the truck is flat and the cabin stands above the engine of the truck. On all the figures, axis X is the longitudinal direction of the truck, axis Y is the transverse direction of the truck, and axis Z is the vertical direction.

The truck 100 comprises a frame 90 and a cabin 80 movable relatively to the frame 90.

The cabin 80 is suspended relatively to the frame 90 of the truck 100. The cabin 80 is thus linked to the frame 90 by a set of springs and shock absorbers.

The cabin 80 is also tiltable relatively to the frame 90 of the truck 100. The cabin 80 may be tilted forward when the truck 100 is not driven, for providing access to the engine, for example for maintenance operations to be performed on the engine.

The cabin 80 is movable between an extreme upper position U and an extreme lower position L. The cabin 80 is movable around a reference position P comprised between the extreme upper position U and the extreme lower position L.

The reference position P is defined as the rest position when no external constraint is applied to the cabin 80, i.e., when the truck 100 is at standstill on a flat and level surface. The cabin 80 can move relatively to the frame 90 in response to the shocks generated by road irregularities, and/or by lateral cornering forces, and/or by longitudinal braking and acceleration forces. In normal driving conditions, the cabin 80 can have pitch, roll, and heave movements relatively to the frame 90, depending on the actual forces on the cabin.

The truck 100 comprises a sealing assembly 50 that will be described in detail below. The sealing assembly 50 is disposed on a front corner of the truck 100.

The proposed sealing assembly 50 for a truck 100 comprising a cabin 80 movable relatively to a truck frame 90 is configured for sealing a gap between the cabin 80 and a bodywork element 85 fixed relatively to the truck frame 90.

The sealing assembly 50 comprises:

- a support member 4 attached to the cabin 80, the support member 4 comprising:
  - a first abutment member 1,
  - a second abutment member 2,
- a bracket 8 comprising:
  - a first flange 5 movable between the first abutment member 1 and the second abutment member 2,
  - a second flange 6,
  - a sealing member 7 linking the first flange 5 and the second flange 6,
- an elastic member 9 disposed between the first flange 5 of the bracket 8 and the first abutment member 1 of the support member 4 and configured for biasing the first flange 5 in direction of the second abutment member 2, in which the second flange 6 is configured for contacting the frame-fixed bodywork element 85, so that a sealed junction between the support member 4 and the bodywork element 85 is formed.

The sealing assembly 50 is an airflow sealing assembly. The arrangement of the support member 4, the bracket 8 and the elastic member 9 provides a sealed junction between the support member 4 and the bodywork element 85 even when the position of the cabin 80 changes relatively to the frame 90. The gap between the cabin 80 and the bodywork element 85 fixed relatively to the truck frame 90 remains thus closed.

The air flow resulting from truck speed, possibly combined with headwind, cannot enter through the sealed gap anymore, therefore the aerodynamic losses are reduced. Fuel economy of the truck 100 is improved.

On the described example, the frame-fixed bodywork element 85 is a headlight panel of the truck 100.

Alternatively or in a complementary way, the frame-fixed bodywork element 85 can be a front grille of the truck 100.

The support member 4 is rigid. The bracket 8 is rigid.

In some examples of implementation, the support member 4 is made of plastic material. The support member 4 is for example formed by plastic injection.

In some examples, the bracket 8 is made of plastic material. Similarly, the bracket 8 can be formed by plastic injection.

In this case, the first flange 5, the sealing member 7 and the second flange 6 are integral together.

The bracket 8 can also be formed by an assembly of separated parts forming altogether the first flange 5, the sealing member 7 and the second flange 6.

Figure 2:
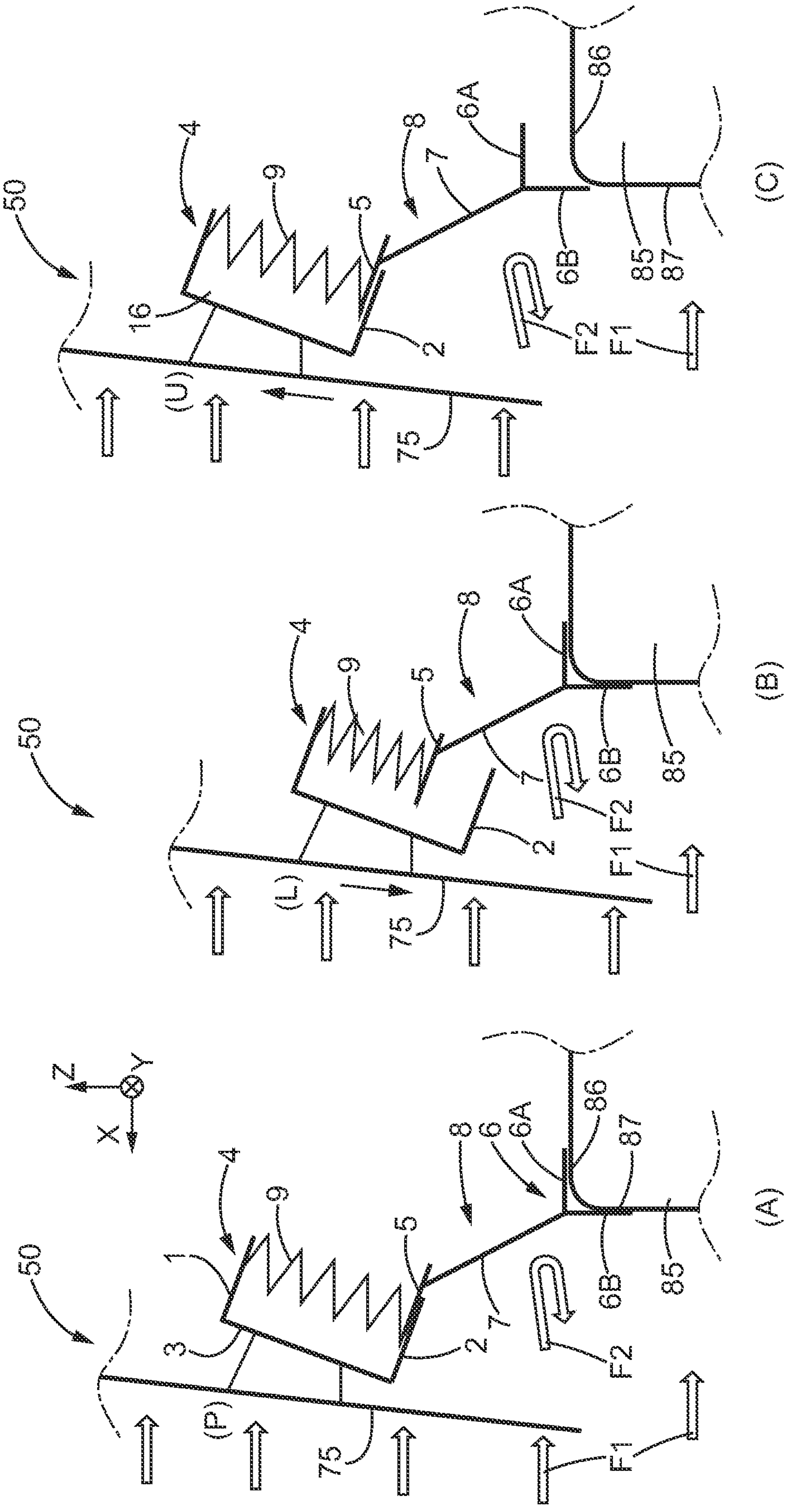
FIG. 2 is a schematic side view illustrating the operation of a sealing assembly according to the disclosure.

FIG. 2 is side view illustrating the interaction of the sealing assembly 50 with the bodywork element 85.

A sealed junction between the support member 4 and the bodywork element 85 is formed when the bracket 8 is in contact with the bodywork element 85.

The sealing member 7 provides a wall that deflects the air flow. The air flow is prevented from flowing in the gap between the cabin and the frame of the truck. On FIG. 2, the arrow F1 indicates the external air flow resulting from the truck motion and/or headwind.

The sealing member 7 is an airflow deviating surface that seals the gap between the cabin 80 and the bodywork element 85 fixed relatively to the truck frame 90.

The sealing member 7 of the bracket 8 is continuous. In other words, there is no hole in the sealing member 7. The sealing member 7 prevents the air flow from passing between the support member 4 and the bodywork element 85.

The arrow F2 schematically indicates that the external air flow is blocked by the sealing member 7, and that the external air flow F1 can't progress in the gap between the cabin and the frame of the truck.

When the cabin 80 is moved from the reference position P in direction of the lower limit L, as schematically represented by the plain vertical arrow on part B of FIG. 2, the elastic member 9 is further compressed, and the first flange 5 is lifted from the second abutment member 2. The second flange 6 remains firmly in contact with the bodywork element 85, as it is pushed in the direction of the bodywork element 85. This corresponds to a situation in which the cabin 80 moves down along the vertical axis Z. When the cabin 80 comes back to the reference position P, the compression of the elastic member 9 is progressively reduced, until the first flange 5 makes contact again with the second abutment member 2.

The second flange 6 of the bracket 8 comprises:

a first section 6A configured for contacting a top surface 86 of the frame-fixed bodywork element 85, a second section 6B configured for contacting a side surface 87 of the frame-fixed bodywork 85.

The two contact sections 6A, 6B, each contacting a different portion of the bodywork element 85, provide an efficient sealing tolerant to relative movements between the bracket 8 and the bodywork element 85.

The top surface 86 extends in a horizontal plan when the sealing assembly 50 is in its nominal installation position in the truck 100. The side surface 87 extends vertically when the sealing assembly 50 is in its nominal installation position in the truck 100.

The second flange 6 has a L-shaped cross-section. The first section 6A and the second section 6B form the two wings of the L shape.

When is cabin 80 is moved from the reference position P in direction of the upper limit U, the second abutment member 2 pulls the first flange 5 upwards, therefore the whole bracket 8 moves upwards. The first section 6A of the second flange 6 is lifted from the top surface 86 of frame-fixed bodywork element 85 and there's no contact any more between these two elements, as illustrated on part C of FIG. 2. The second section 6B of the second flange 6 slides against a vertical section 87 of the frame-fixed bodywork element 85, and still seals the junction between the bracket 8 and the bodywork element 85. The contact area between the second section 6B and the vertical section 87 is progressively reduced but contact is still ensured as long as the cabin movement amplitude relatively to the reference position P is smaller than the height of the second section of the second flange 7.

For cabin movements with very large amplitude, the contact between the second flange 7 and the frame-fixed bodywork element 85 may not exist anymore. When the amplitude of the extension decreases, and the cabin 80 comes back closer to its reference position P, and the contact between the second flange 6 and frame-fixed bodywork element 85 is restored. The loss of contact between the second flange 6 and the frame-fixed bodywork element 85 happens only for very brief moments, since it corresponds to oscillations of the cabin 80 with extreme amplitudes. Furthermore, these extreme oscillations are unlikely to happen at cruising speeds, which are the driving sequences where drag and drag reduction matters most. The reason is that cruising usually takes place on reasonably smooth roads that are unlikely to generate large cabin amplitudes.

On part C of FIG. 2, the sealing between the second section 6B of the second flange 6 and the bodywork element 85 is still just ensured, with a vertical overlap reduced to near zero.

In a normal installation position of the sealing assembly 50 on a truck 100, the different elements are disposed sequentially along a vertical axis Z in the following order: the frame-fixed bodywork element 85, the second flange 6 of the bracket 8, the sealing member 7 of the bracket 8, the second abutment member 2 of the support member 4, the first flange 5 of the bracket 8, the elastic member 9, and the first abutment member 1 of the support member 4.

On a cross-section of the bracket 8, the first flange 5 extends on both sides of the axis of the sealing member 7. The sealing member 7 joins the first flange 5 in a T-like junction.

At least a portion of the elastic member 9 is contained in the opened cavity defined by the C shape of the support member 4.

In the illustrated examples of the sealing assembly 50, the first abutment member 1 of the support member 4 and the second abutment member 2 of the support member 4 extend in parallel planes.

The support member 4 comprises a linking portion 3 linking the first abutment member 1 and the second abutment member 2.

Figure 3:
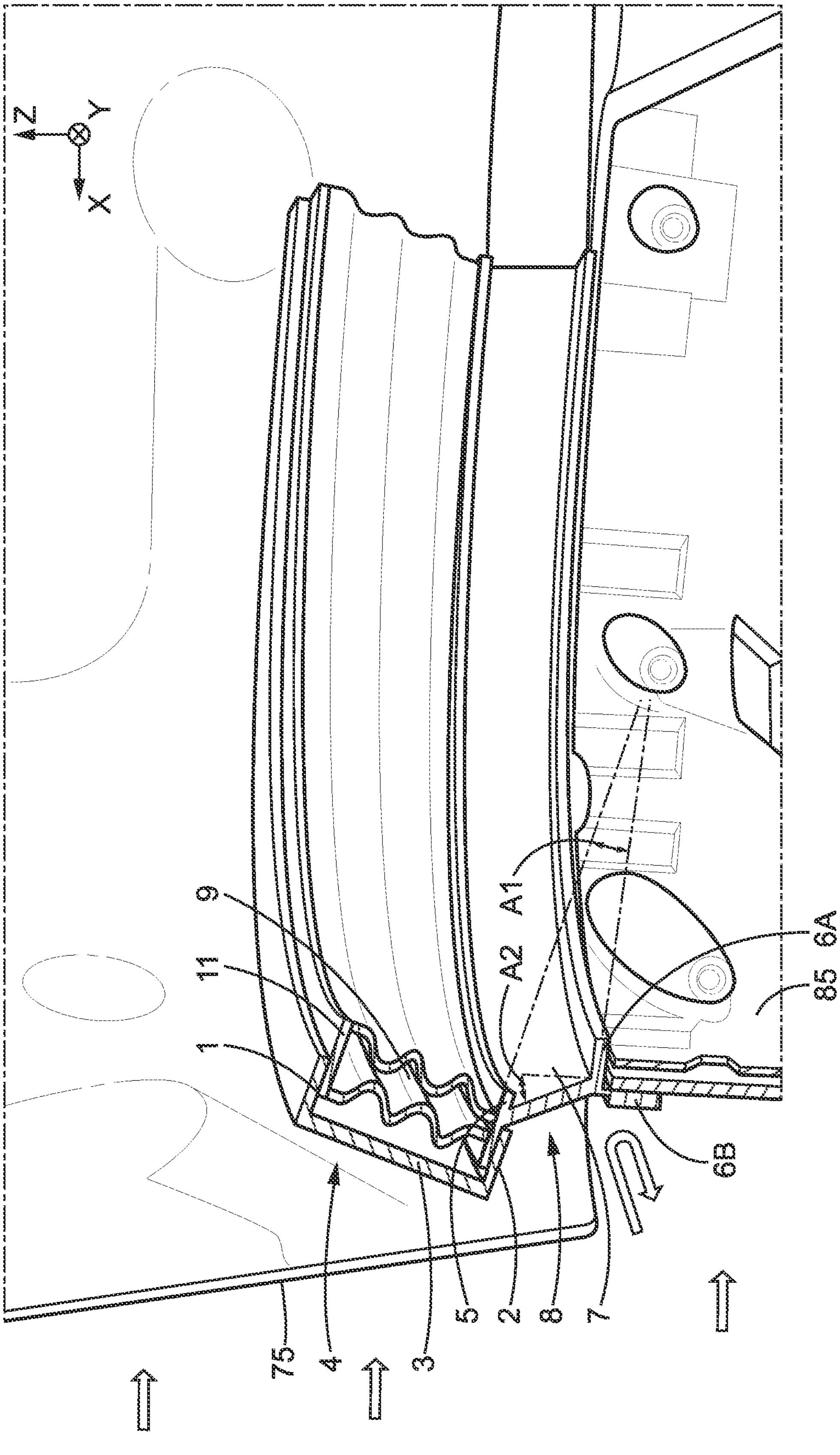
FIG. 3 is a perspective view of a sealing assembly according to the disclosure.
Figure 4:
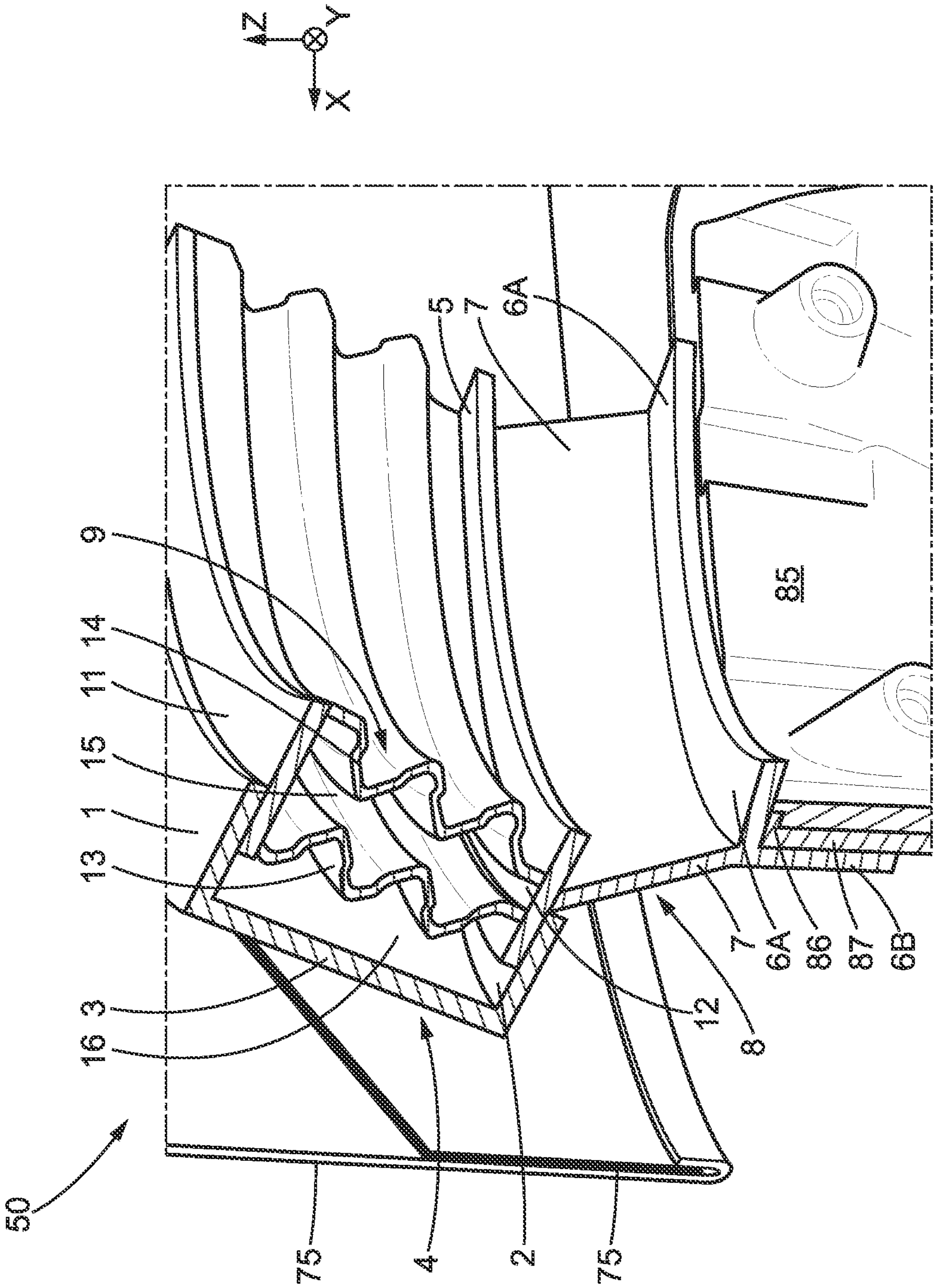
FIG. 4 is a detailed view of the sealing assembly of FIG. 3.

As represented on FIGS. 2 to 4, a cross section of the support member 4 has a U shape. The support member 4 can thus be compact.

When the support member 4 is formed by plastic injection, the first abutment member 1, the second abutment member 2 and the linking portion 3 are integral together.

In the illustrated example of the sealing assembly 50, the first flange 5 is slanted relatively to the second flange 6. The first flange 5 is slanted downwards, which means that the vertical position along the vertical axis Z decreases when the longitudinal position is moved in direction of the back of the truck 100.

This orientation is well suited to cope with both translational movements and rotational movements of the cabin 80 with respect to the frame 90 of the truck 100.

The first flange 5 makes an angle A1 comprised between 10° and 25° relatively to the first section 6A of the second flange 6.

In other words, a cross section of the first flange 5 makes an angle comprised between 10° and 25° with respect to the part of the second flange 6 contacting the top of the bodywork element 85.

In a non-represented example, the first section 6A of the second flange 6 and the first flange 5 may extend in parallel planes.

In the illustrated examples of the sealing assembly 50, the sealing member 7 is slanted relatively to the first section 6A of the second flange 6 and is slanted relatively to the second section 6B of the second flange 6.

This orientation is well suited to cope with both translation movements and rotation movements of the cabin 80 with respect to the frame 90 of the truck 100. A cross section of the sealing member 7 makes an angle A2 comprised, for example, between 65° and 80° with respect to a cross section of the first section 6A of the second flange 6.

The first flange 5 is located closer to the front of the truck than the second flange 6 when the bracket 8 is in normal operation conditions.

The second flange 6 and a contact area of the frame-fixed bodywork element 85 have complementary shapes. As illustrated on FIGS. 2 to 4, an external corner of the frame-fixed bodywork element 85 fits in an internal corner of the second flange 6.

The contact area between the second flange 6 and the frame-fixed bodywork element 85 comprises at least a portion of the top surface 86 of the frame-fixed bodywork element 85 and at least a portion of the side surface 87 of the frame-fixed bodywork 85.

FIG. 3 and FIG. 4 represent an example of implementation in which the elastic member 9 comprises bellows type springs. More precisely, the elastic member 9 is in this case a bellows type spring. This kind of spring can be installed in a stable way.

As detailed on FIG. 4, the elastic member 9 comprises a first contact surface 11 contacting the first abutment member 1 and a second contact surface 12 contacting the first flange 5 of the bracket 8.

The first contact surface 11 of the elastic member 9 may be fixed to the first abutment member 1 of the support member 4.

For example, the first contact surface 11 of the elastic member 9 may be glued to the first abutment member 1, or may be fixed by screws.

In other examples, the elastic member 9 may comprise any other compressible element. The elastic member 9 may be any other compressible element.

The compressible element can be continuous or divided in individual segments, based on the desired compressible function.

The bellows type elastic member 9 comprises two wavy sections 13, 14 extending side by side. The two wavy sections 13, 14 are integral with a top linking part and a bottom linking part. The elastic member 9 defines a closed volume 15 with the wavy sections 13, 14 forming lateral boundaries of the closed volume 15.

The elastic member 9 is here made of rubber material.

The support member 4, the elastic member 9 and the first flange 5 of the bracket 8 define a closed volume 16 when the first flange 5 is in contact with the second abutment member 2.

Even when the first flange 5 is lifted from the second abutment member 2, as shown of part B of FIG. 2, the air flow can't go through the defined volume 16, since the only opening is the gap opened between the first flange 5 and the second abutment member 2. No gap exists between the elastic member 9 and the first abutment member 1 since the two parts remain in contact.

In a non-represented example of the sealing assembly 50, the elastic member 9 comprises a set of metal springs.

The metal springs of the set of metal springs are for example helical springs. The metal springs of the set of metal springs extend in parallel directions and are spaced apart from one another.

The support member 4 is configured to be attached to a bodywork element 75 of the cabin 80.

The sealing assembly 50 can be fitted as an original equipment of a brand-new truck. The sealing assembly 50 can also be installed as an aftermarket equipment, since it can be attached to an existing piece of bodywork.

In the illustrated example, the support member 4 is configured to be attached to a front lid 75 of the truck 100. The front lid 75 of the cabin 80 defines the front surface of the truck 100, located above the front bumper.

Figure 5:
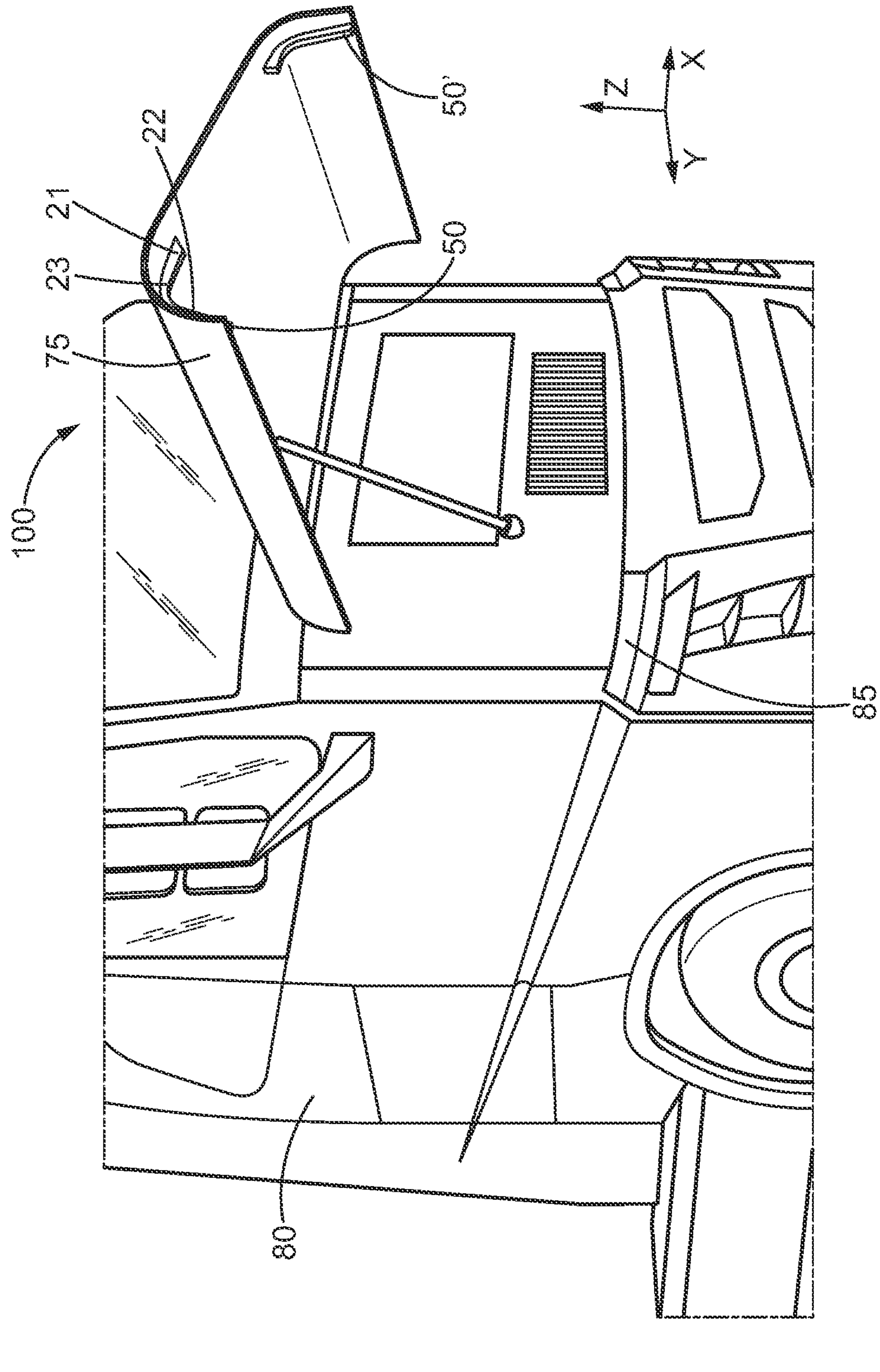
FIG. 5 is another view of a truck equipped with a sealing assembly according to the disclosure.

In the example schematically illustrated on FIG. 5, the support member 4 is integral with a front lid 75 of the cabin 80.

The installation of the sealing assembly 50 is made easier and quicker, since a key component is integral with the front lid 75 and doesn't require any installation or fitting.

On FIG. 5, the truck 100 is represented with the front lid 75 is an opened position. Therefore, the sealing assembly 50 is not in contact with the bodywork element 85.

The sealing assembly 50 comprises a first portion 21 configured for extending transversally relatively to the truck frame 90 and a second portion 22 configured for extending longitudinally relatively to the truck frame 90.

The first portion 21 and second portion 22 are linked by a third portion 23.

The third portion 23 may be curved, as represented on FIG. 5.

On this figure, the top of the headlight panel 85 is curved. A general shape of a horizontal cross-section is a quarter of a circle.

The described sealing assembly 50 can be fitted as original equipment on a brand-new truck. As original equipment, it can be fitted as a standard equipment or as an option.

The sealing assembly can also be proposed as an aftermarket kit for retrofit of trucks not originally equipped.

The aftermarket kit 60 comprises:

a sealing assembly 50 as described earlier, a fixing member configured for fixing the support member 4 to a front lid of the truck 100.

The aftermarket kit 60 can be sold by the manufacturer of the truck, or by independent suppliers. The aftermarket kit can be fitted to the truck 100 by the aftermarket network of the truck brand, or by an independent service provider.

On the example represented on FIG. 5, the truck 100 comprises a second sealing assembly 50' disposed on a second front corner of the truck 100.

The first sealing assembly 50 and the second sealing assembly 50' are symmetrical with respect to a median plan. The first sealing assembly 50 and the second sealing assembly 50' are mirror images.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A sealing assembly for a truck comprising a cabin movable relatively to a truck frame, the sealing assembly being configured for sealing a gap between the cabin and a bodywork element fixed relatively to the truck frame, the sealing assembly comprising:

a support member attached to the cabin, the support member comprising:
  a first abutment member; and
  a second abutment member;

a bracket comprising:
  a first flange movable between the first abutment member and the second abutment member;
  a second flange; and
  a sealing member linking the first flange and the second flange; and an elastic member disposed between the first flange of the bracket and the first abutment member of the support member and configured for biasing the first flange in direction of the second abutment member;

wherein the second flange is configured for contacting the frame-fixed bodywork element, so that a sealed junction between the support member and the bodywork element is formed.

2. The sealing assembly of claim 1, wherein the first abutment member of the support member and the second abutment member of the support member extend in parallel planes.

3. The sealing assembly of claim 1, wherein the support member comprises a linking portion linking the first abutment member and the second abutment member.

4. The sealing assembly of claim 1, wherein a cross section of the support member has a U shape.

5. The sealing assembly of claim 1, wherein the second flange of the bracket comprises:

a first section configured for contacting a top surface of the frame-fixed bodywork element; and a second section configured for contacting a side surface of the frame-fixed bodywork.

6. The sealing assembly of claim 1, wherein the first flange is slanted relatively to the second flange.

7. The sealing assembly of claim 5, wherein the sealing member is slanted relatively to the first section of the second flange and is slanted relatively to the second section of the second flange.

8. The sealing assembly of claim 1, wherein the elastic member comprises a first contact surface contacting the first abutment member and a second contact surface contacting the first flange of the bracket.

9. The sealing assembly of claim 1, wherein the elastic member is a bellows type spring or any other compressible element.

10. The sealing assembly of claim 9, wherein the support member, the elastic member, and the first flange of the bracket define a closed volume when the first flange is in contact with the second abutment member.

11. The sealing assembly of claim 1, wherein the elastic member comprises a set of metal springs.

12. The sealing assembly of claim 1:

wherein the support member is configured to be attached to a bodywork element of the cabin; or wherein the support member is integral with a front lid of the cabin.

13. The sealing assembly of claim 1, wherein the frame-fixed bodywork element is a headlight panel of the truck and/or a front grille of the truck.

14. An aftermarket kit comprising:

the sealing assembly of claim 1; and a fixing member configured for fixing the support member to a front lid of the truck.

15. A truck comprising the sealing assembly of claim 1, wherein the truck comprises a frame and cabin movable relatively to the frame, wherein the sealing assembly is disposed on a front corner of the truck.

16. A truck comprising the aftermarket kit of claim 14, wherein the truck comprises a frame and cabin movable relatively to the frame, wherein the sealing assembly is disposed on a front corner of the truck.

* * * * *